United States Patent [19]

Overholt

[11] 4,432,532

[45] Feb. 21, 1984

[54] DIRECT DRIVE DUAL DRUM WINCH

[76] Inventor: Mark Overholt, 6867 Wooster Pike, Medina, Ohio 44256

[21] Appl. No.: 461,644

[22] Filed: Jan. 27, 1983

[51] Int. Cl.³ .................. B66D 1/08; F16D 1/00; F16D 3/50
[52] U.S. Cl. .................................. 254/291; 403/4; 403/335; 464/137
[58] Field of Search .................. 254/290, 291, 361; 464/71, 137, 153, 154, 182, 901; 403/4, 335, 336; 308/236

[56] References Cited

U.S. PATENT DOCUMENTS

| 1,434,759 | 11/1922 | Wilkinson | 464/137 X |
| 1,638,796 | 8/1927 | Cares et al. | 464/137 X |
| 1,936,573 | 11/1933 | Anger | 464/137 |
| 1,940,777 | 12/1933 | Thompson | 464/137 |
| 3,448,962 | 6/1969 | Miller | 254/291 |
| 3,912,347 | 10/1975 | Pflugner et al. | 308/236 |
| 4,204,664 | 5/1980 | Bryan | 254/291 X |
| 4,398,698 | 8/1983 | Crawford et al. | 254/291 |

Primary Examiner—Stuart S. Levy
Assistant Examiner—Joseph J. Hail, III

[57] ABSTRACT

For use in service and maintenance of oil and gas (or water) wells, a truck mounted line and cable winch. A winch has dual drums each of which is independently driven by a direct coupled radial piston hydraulic motor. An improved flexible coupling connects aligned motor and drum shafts.

4 Claims, 4 Drawing Figures

DIRECT DRIVE DUAL DRUM WINCH

BACKGROUND OF THE INVENTION

The present invention relates to a direct drive dual drum line and cable winch for mounting on the deck of a mobile well tending rig. The invention enables a user to selectively raise and lower a "sand line" and a "tubing cable drum" elevated by a mast above a working well producing oil and gas (or water), for routine maintenance and service.

U.S. Pat. No. 2,276,224, March, 1942, Cardwell, describes a mobile well tending rig having dual drums (18 and 22) driven by a mechanical transmission. U.S. Pat. No. 3,788,605, January, 1974, Johnson, describes a direct drive auto winch powered by a hydraulic motor.

SUMMARY OF THE INVENTION

It is an object of the invention to provide an improved dual drum line and cable winch for mounting on the deck of a mobile well tending rig.

It is a further object of the invention to provide an improved direct drive dual drum line and cable winch powered by radial piston hydraulic motors.

Still further, it is an object of the invention to provide an improved flexible coupling for direct coupling of a hydraulic motor drive shaft to a winch drum drive shaft.

A general object of the invention is to provide the well tending art with a truck mounted dual drum winch which is relatively low in cost, easy to service and maintain in the field, protected against damage, and fully capable of providing a more than ample line or cable pull.

These and other objects of the invention will become apparent in view of the drawings and detailed description.

In general, a direct drive dual drum line and cable winch for mounting on the deck of a mobile well tending rig has a generally rectangular frame with front and rear channels for cross connection of a drive side plate to a parallel second side plate. The base of the frame is adapted for attachment to the rig deck. The side plates each have front and rear holes therethrough for integral attachment of a bearing mounting block. Each bearing block has a circular bore for coaxial positioning of a drum shaft bearing. Each front and rear opposed and axially aligned bearing has a radial flange for attachment to a bearing mounting block. Front and rear winch drums are positioned within the frame transversely of the side plates. Each drum has a shaft rotatably mounted within a bearing on a second side plate and a drive shaft rotatably mounted within and projecting substantially beyond a bearing on a first side plate. Front and rear bell housings are positioned coaxially around each drum drive shaft. The inner end of each bell housing is connected to a drive side plate outwardly of a radial bearing flange. The outer end of each bell housing is adapted for mounting a hydraulic motor. Each front and rear hydraulic motor has radial pistons and an axially oriented inwardly projecting drive shaft aligned with a drum drive shaft. Front and rear flexible couplings operatively connect the aligned drum shafts within the bell housings.

A flexible drive shaft coupling according to the invention has a driven half and a driver half. A driven half is securely connected to a winch drum drive shaft and has an outer face carrying a series of axially projecting stud couplers having a large diameter head. A driver half is securely connected to a hydraulic motor drive shaft and has an outer face with a series of axially oriented bores to loosely receive and house heads of aligned stud couplers carried by the driven half.

THE DRAWINGS

DESCRIPTION OF THE INVENTION

Figure 1:
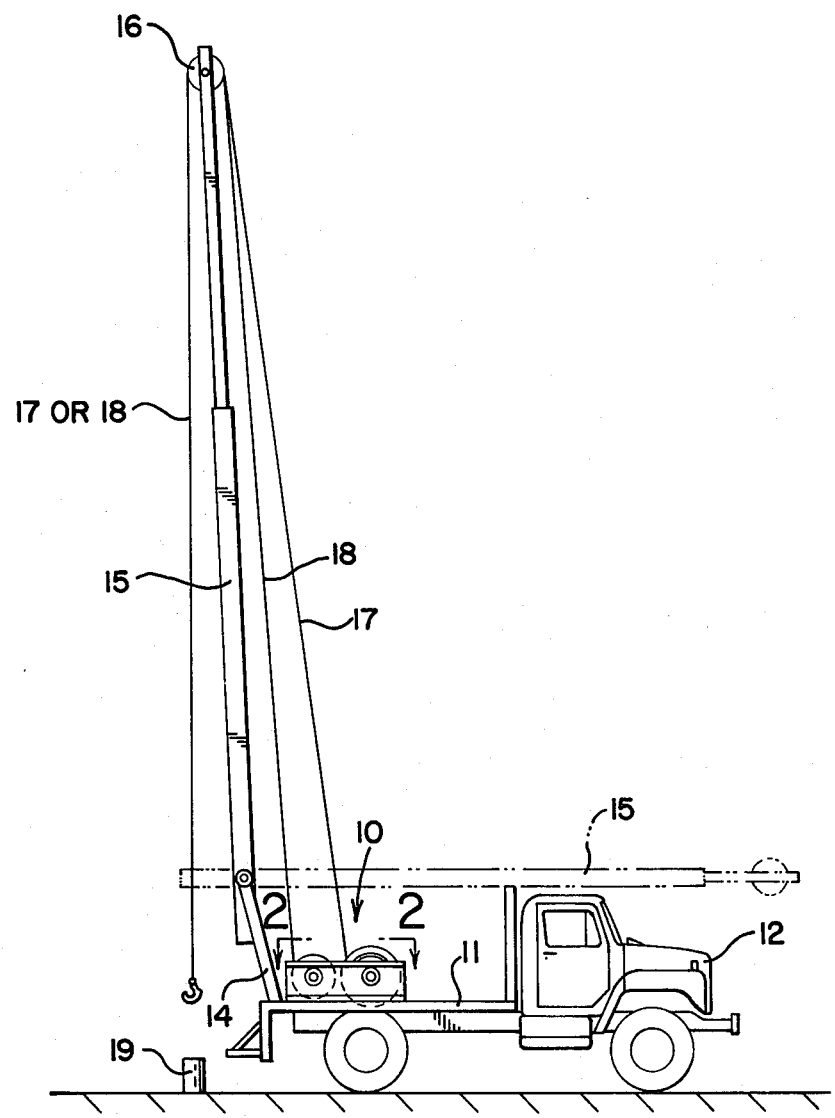
FIG. 1 is a side view of a direct drive dual drum line and cable winch according to the invention mounted on the deck of a truck.

A direct drive dual drum line and cable winch according to the invention is referred to generally by the numeral 10. Referring to FIG. 1, a winch 10 is securely mounted on a medial portion of the deck 11 of a truck 12. A stanchion 14 attached to the rear portion of the deck 11 carries a raisable and extendible well tending mast 15. The end of the mast 15 carries rotatable crown sheeves 16 for positioning a "sand line" 17 and a "tubing cable" 18 above the casing 19 of a well requiring maintenance or repair.

Figure 2:
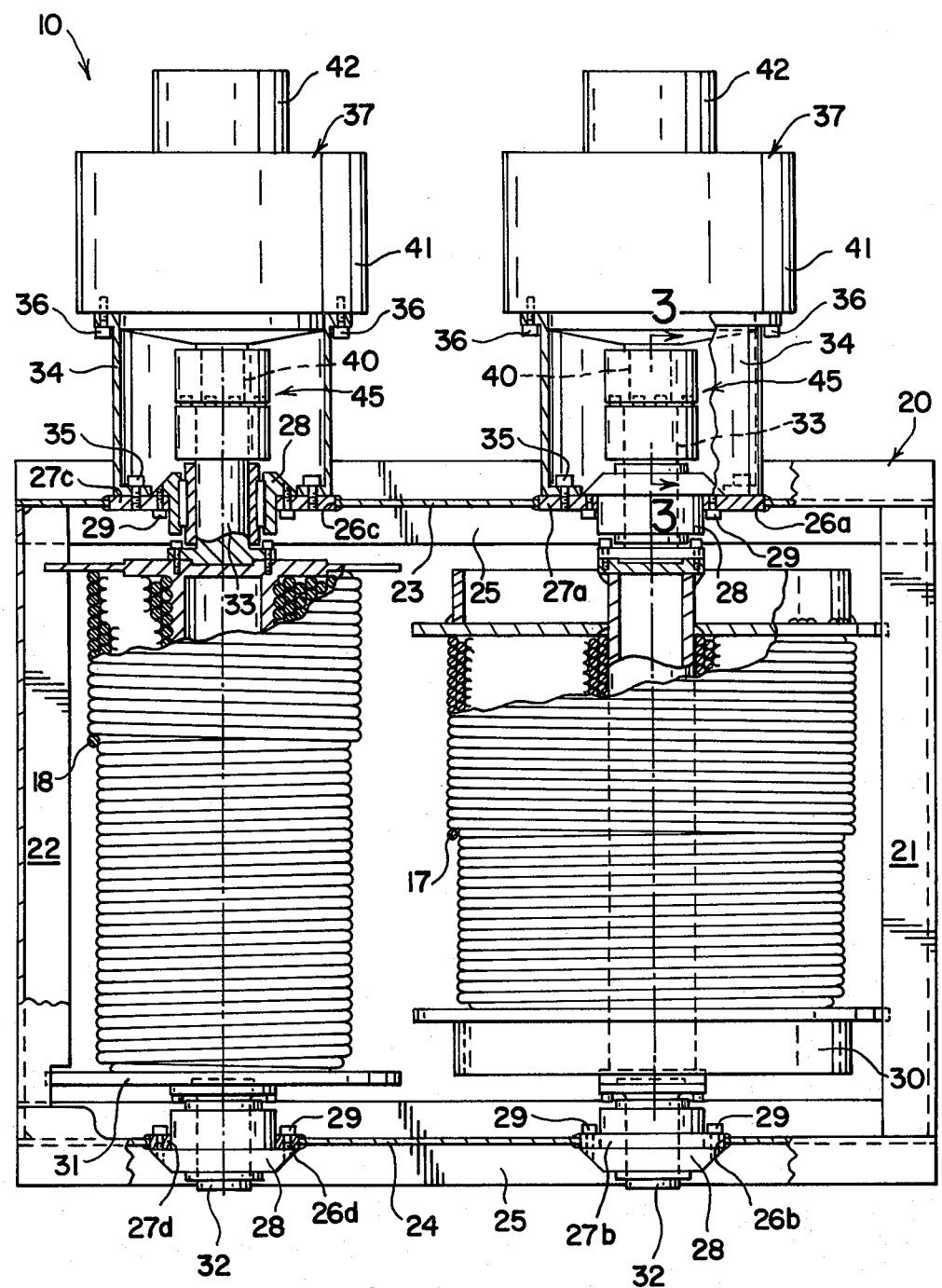
FIG. 2 is a top view of the direct drive dual drum winch taken substantially as indicated on line 2—2 of FIG. 1.

Referring to FIG. 2, the winch 10 has a generally rectangular welded frame indicated at 20. A frame 20 has a front channel 21 and a rear channel 22. The channels 21 and 22 provide for cross connection of a drive or first side plate 23 to a second or idle side plate 24. The bottom of each side plate, 23 and 24, carries a base plate 25 for attachment to the truck deck 11. The side plates 23 and 24 each have front and rear holes, 26a-d, therethrough for integral attachment of a bearing mounting block, 27a-d, therein. As shown, the holes 26a and 26c in the drive side plate 23 have substantially the same dimensions for attachment of identical mounting blocks 27a and 27c. Also as shown, the holes 26b and 26d in the idle side plate 24 have substantially the same dimensions for attachment of identical mounting blocks 27b and 27d. Each mounting block 27a-d has a precision diameter circular bore for coaxial positioning of an anti-friction drum shaft bearing 28.

The front and rear opposed and axially aligned bearings 28 are roller bearings with a single set collar and assembled with "Z" seals. Each bearing 28 has a radial flange adapted for precision attachment, as by removable bolts 29, to a bearing mounting block 27.

The winch drum for the "sand line" 17 is indicated at 30. The winch drum for the "tubing cable" 18 is indicated at 31. The front drum 30 and the rear drum 31 are positioned within the frame 20 transversely of the side plates, 23 and 24. As shown, each winch drum has an axle shaft 32 rotatably mounted substantially within a bearing 28 on the side plate 24. Each winch drum also has a drive shaft 33 rotatably mounted within and axially projecting substantially beyond a bearing 28 on the side plate 23.

Front and rear generally cylindrical bell housings 34 are positioned coaxially around the front and rear drive shafts 33 for projection thereof from damage. Each bell housing has an inner end adapted for secure attachment to a bearing mounting plate 27, as by removable bolts 35, radially outwardly of the radial flange of a bearing 28. The outer end of each bell housing has a radial flange for secure mounting, as by removable bolts 36, of a front or rear radial piston hydraulic motor 37.

Each hydraulic motor 37 has radial pistons for producing a high torque output through an axially inwardly oriented projecting drive shaft 40 rotated at a relatively low speed.

By way of a general description, in a suitable motor 37 drive shaft torque is generated by hydraulic thrust on an eccentric. There is no metal-to-metal contact between piston and crankshaft which provides for high starting torque and low volumetric losses. A crankshaft with integral eccentric is journalled in large capacity tapered roller bearings on each side of the main housing 41 which has five or ten radially disposed cylinders. Oil is directed to and from the crankshaft through a distributor sleeve which is housed inside a distributor housing 42 having feed and return piping lines connected to a truck mounted hydraulic pump (not shown). The inlet and outlet ports in the crankshaft are sealed by an annular groove and sealing ring element. Axial oilways in the crankshaft connect with two accurately machined ports in the eccentric, which carries a pentagon. On each of the five faces of the pentagon, rides a hollow piston through which oil flows to and from each cylinder. All hydraulic loads are balanced by a floating pressure ring seal arrangement which mates with the inner face of each piston. The thrust of the high pressure column of oil is then transmitted direct to the eccentric.

The drive shaft 40 of each hydraulic motor 37 is operatively connected to the aligned drive shaft 33 of a winch drum, 30 and 31, by a flexible coupling indicated at 45. The front and rear couplings 45 are and should be a flexible device, as distinguished from a rigid device, for connecting the rotating shafts, 33 and 40, end to end. A flexible coupling 45 will allow for a certain amount of misalignment caused by extreme conditions of field usage of the winch 10, besides acting as a shock absorber for vibrations and jerks in torque transmission. A coupling 45 is different from known flexible couplings in that the connection between the two halves is not formed by a "yielding intermediate element" such as rubber, leather, fabric, steel springs or some other flexible material.

Figure 3:
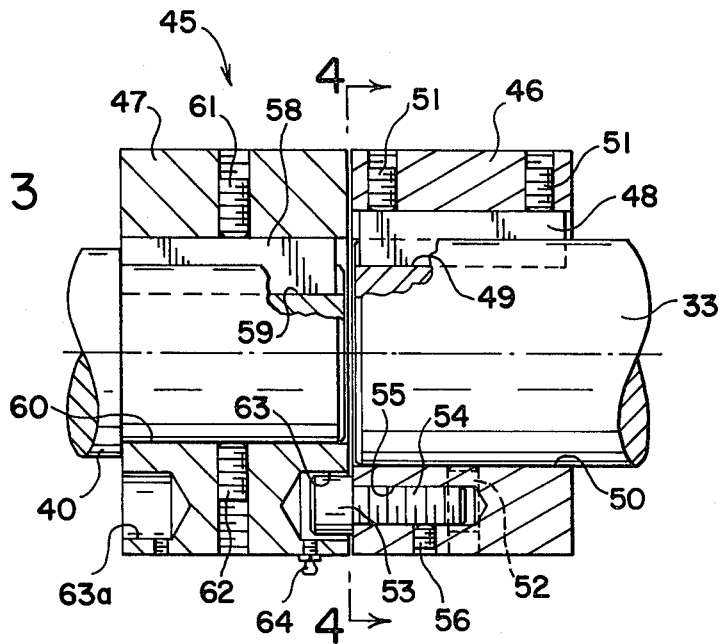
FIG. 3 is a plan view, broken away, of a flexible coupling to operatively connect motor and drum drive shafts according to the invention; and, FIG. 4 is a section taken substantially as indicated on line 4—4 of FIG. 3.
Figure 4:
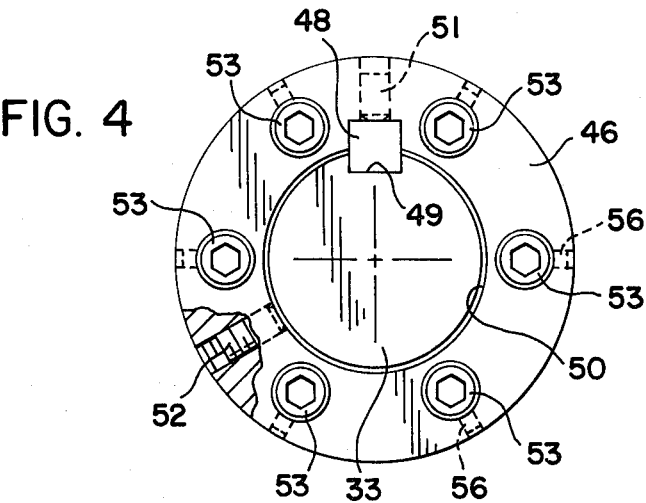

Referring to FIGS. 3 and 4, a flexible coupling 45 has a driven half 46 and a driver half 47. The driven half 46 is securely connected to a winch drum drive shaft 33 by a key 48 positioned in a key way 49 formed between the shaft 33 and the face of a coaxial bore 50. The key 48 is secured in the key way 49, as by two radially counter sunk externally threaded set screws 51. The driven half 46 is further secured to the shaft 33, as by one or more radially counter sunk externally threaded set screws 52.

The outer face of a driven half 46 carries a series of (six, as shown) axially projecting stud couplers 53. Each stud 53 has a large diameter head and a threaded shank 54 rotatably inserted into a mating axial bore 55. A stud 53 is further secured to the driven half 46, as by a radially counter sunk externally threaded screw 56.

The driver half 47 is securely connected to a hydraulic motor drive shaft 40 by a key 58 positioned in a key way 59 formed between the shaft 40 and the face of a coaxial bore 60. The key 58 is secured in the key way 59, as by one or more radially counter sunk externally threaded set screws 61. The driver half 47 is further secured to the shaft 40, as by one or more radially counter sunk externally threaded set screws 62.

The outer face of a driver half 47 has therein a series of axially oriented bores 63. Each bore 63 has a diameter and depth to loosely receive and house the head of each aligned stud coupler 53, carried by the driven half 46. Each bore 63 is also provided with a fitting 64 for packing the coupling 45 with a heavy duty grease lubricant.

The coupling driver half 47 is also "bidirectional" in that the inner face may be fabricated with a series of axially oriented bores 63a, conforming to the outer face bores 63. In the field or after extensive use, a coupling 45 can be serviced and maintained by reversing the driver half 47 and by replacement of the stud couplers 53 on the driven half 46.

ALTERNATIVE EMBODIMENT

Although not shown, it should be apparent from the above description that a direct drive dual drum line or cable winch according to the invention could be made wherein the drums 30 or 31 could be driven by dual motors. In such an embodiment, an axle shaft 32 mounted on the second or idle side plate 24 would be lengthened and converted to a drive shaft 33 for rotation through a coupling 45 by a hydraulic drive motor 37 mounted on a bell housing 34. The drive motors 37 generally described above are particularly suitable for a tandem or "both end" drive for a drum 30 or 31. Therefore, the scope of the invention should be determined solely by the claims as granted.

What is claimed is:

1. A direct drive dual drum line and cable winch for the deck of a mobile well tending rig, comprising: a generally rectangular frame with front and rear channels for cross connection of a drive side plate to a parallel second side plate, the base of said frame being adapted for attachment to said rig deck, each said side plate having front and rear holes therethrough for integral attachment of a bearing mounting block, each said front and rear mounting block having a circular bore; front and rear opposed and axially aligned bearings positioned within said bore of a mounting block, each said bearing having a radial flange for attachment to a mounting block; front and rear winch drums positioned within said frame transversely of said side plates, each said drum having a shaft rotatably mounted within a bearing on said second side plate and a drive shaft rotatably mounted within and axially projecting beyond a bearing on said drive side plate; front and rear bell housings positioned coaxially around each said drum drive shaft, the inner ends of each said housing being connected to a drive side plate outwardly of said radial flange of a bearing, the outer end of each said housing being adapted for mounting a hydraulic motor; front and rear hydraulic motors each having radial pistons and an axially oriented inwardly projecting drive shaft aligned with said drive shaft of a winch drum; and, flexible couplings connecting said aligned drive shafts within said bell housings.

2. A direct drive dual drum winch according to claim 1, wherein each said flexible coupling comprises a driver half and a driven half, each said driven half being securely connected to said drive shaft of a winch drum and having an outer face carrying a series of axially projecting stud couplers having a large diameter head, each said driver half being securely connected to said drive shaft of a hydraulic motor and having an outer face with a series of axially oriented bores to loosely receive and house said heads of aligned stud couplers carried by said driven half.

3. A direct drive dual drum winch according to claim 2 wherein each said bore in a driver half is provided with a fitting for packing said coupling with a grease lubricant.

4. A direct drive dual drum winch according to claim 2 wherein said driver half has a series of said axially oriented bores on both said outer face and an inner face thereof.

* * * * *